United States Patent [19]
Kowalczyk et al.

[11] Patent Number: 5,344,230
[45] Date of Patent: Sep. 6, 1994

[54] HIGH HORSEPOWER HYDRAULICALLY DRIVEN CONTINUOUS MIXING AND PROCESSING SYSTEM

[75] Inventors: James E. Kowalczyk; Bernard A. Loomans, both of Saginaw, Mich.

[73] Assignee: APV Chemical Machinery Inc., Saginaw, Mich.

[21] Appl. No.: 656,583

[22] Filed: Feb. 19, 1991

[51] Int. Cl.$^5$ .......................... B01F 7/08; F16H 37/06
[52] U.S. Cl. .................... 366/100; 366/301; 74/410; 74/665 N
[58] Field of Search .......... 366/66, 83, 84, 85, 366/297–301, 100; 74/410, 665 M, 665 N, 661

[56] References Cited

U.S. PATENT DOCUMENTS

| 819,800 | 5/1906 | Richards . | |
|---|---|---|---|
| 1,371,046 | 3/1921 | Mosher . | |
| 1,587,300 | 6/1926 | Hanley, Jr. . | |
| 2,141,306 | 12/1938 | Kuhns | 74/410 |
| 2,248,219 | 7/1941 | Day | 74/410 |
| 3,387,826 | 10/1965 | Loomans . | |
| 3,563,105 | 2/1971 | Graziosi | 74/410 |
| 3,749,374 | 7/1973 | Buchheit . | |
| 3,772,934 | 11/1973 | Warren | 74/410 |
| 3,779,522 | 12/1973 | Loomans . | |
| 3,824,875 | 7/1974 | Willert | 74/665 N |
| 3,901,482 | 8/1975 | Kieffaber . | |
| 3,907,259 | 9/1975 | Leclercq . | |
| 3,969,956 | 7/1976 | Hanslik . | |
| 4,682,510 | 7/1987 | De Bernardi | 74/665 N |
| 4,718,337 | 1/1988 | Wiederkehr | 100/146 |
| 4,826,323 | 5/1989 | Loomans | 366/301 |

FOREIGN PATENT DOCUMENTS

| 0166008 | 1/1986 | European Pat. Off. . | |
|---|---|---|---|
| 2166501 | 8/1973 | France . | |
| 2208779 | 6/1974 | France . | |
| 37465 | 7/1923 | Norway | 366/297 |
| 30485 | 12/1909 | United Kingdom | 74/410 |

Primary Examiner—Timothy F. Simone
Assistant Examiner—Randall E. Chin
Attorney, Agent, or Firm—Learman & McCulloch

[57] ABSTRACT

A mixer or compounder with an elongate barrel having a processing chamber of the configuration of two or more intersecting cylinders receives material at one end and discharges it at the other. Parallel co-rotating mixer shafts extend axially in the chamber and have co-wiping, angularly oriented, mixing members on each shaft, which also wipe the chamber walls. Multiple rotary hydraulic motors, driven synchronously in parallel by the same hydraulic pump system, drive intermediate shafts parallel with the barrel shafts, and a gear driving each mixer shaft is driven by gear mechanisms on the intermediate shafts so that each mixer shaft is driven in the same direction of rotation by both hydraulic motors and imparts an increased equal torque to the mixer shafts.

18 Claims, 3 Drawing Sheets

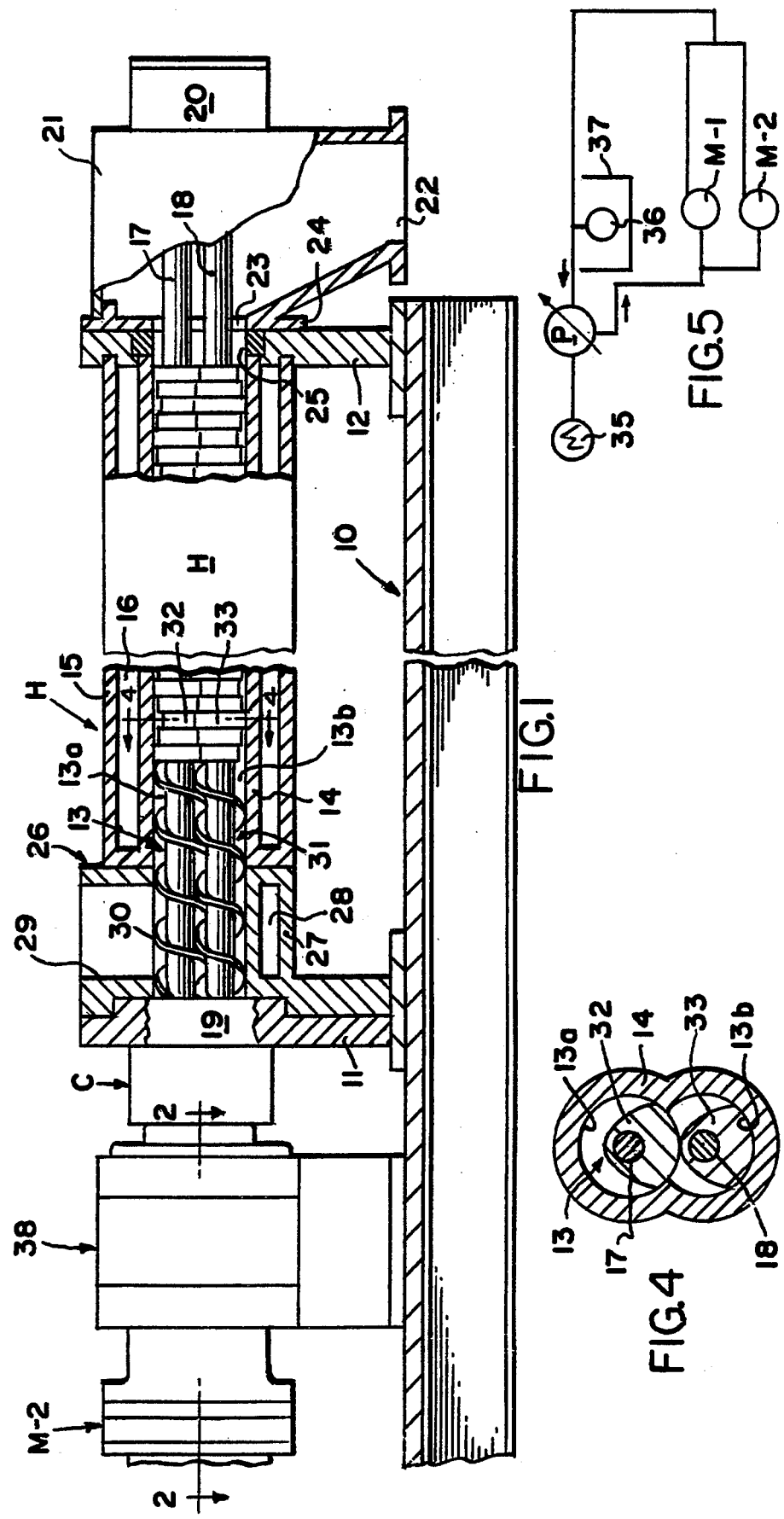

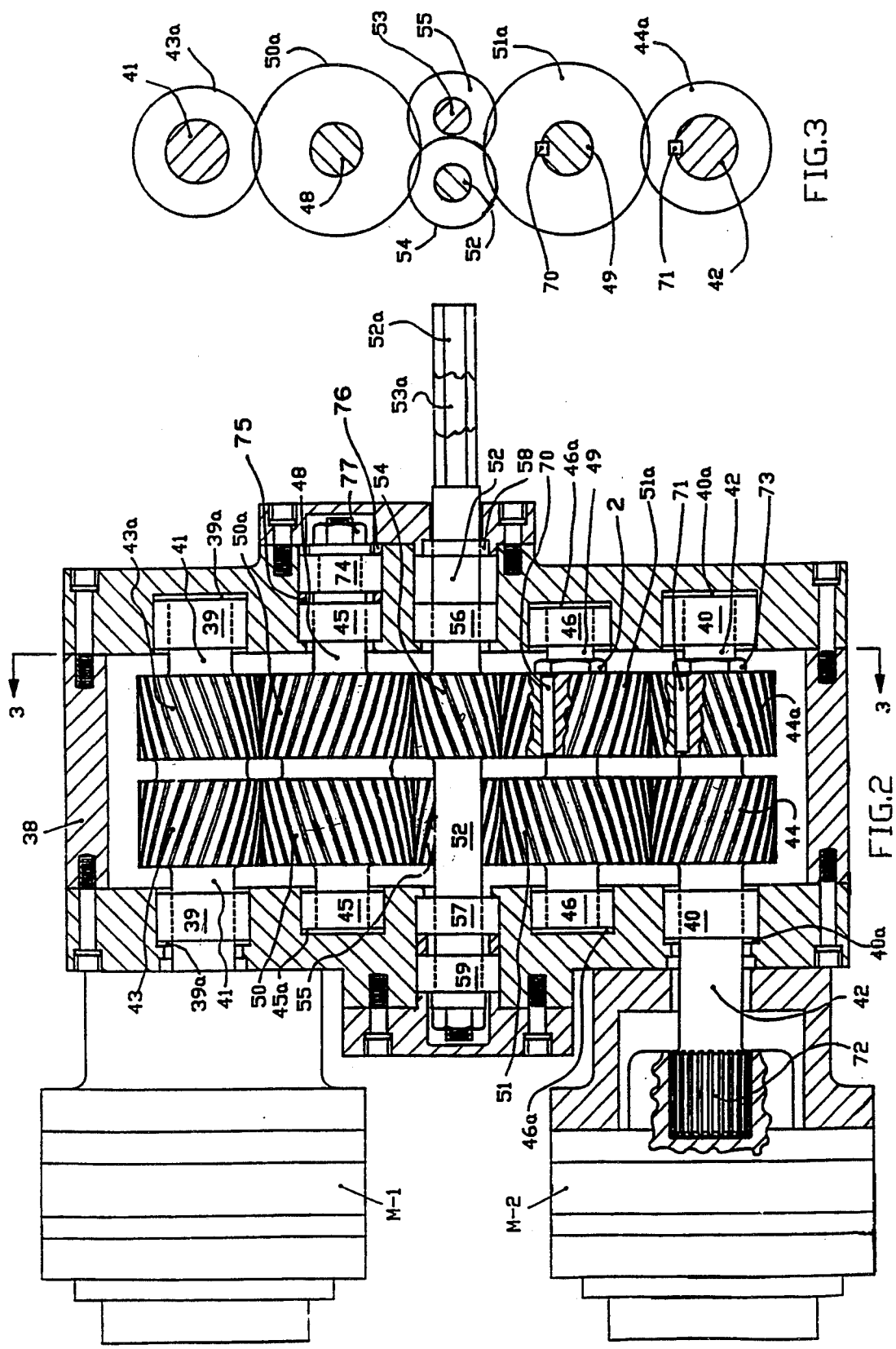

1

HIGH HORSEPOWER HYDRAULICALLY DRIVEN CONTINUOUS MIXING AND PROCESSING SYSTEM

BACKGROUND OF THE INVENTION

This invention relates to continuous mixers and/or processors having at least two side by side parallel mixer shafts extending through an elongate barrel having walls of the configuration of a plurality of intersecting cylinders, and having radially interacting, self-wiping, and also barrel-wiping, mixing and conveying members on each shaft. In such machinery which may be used for mixing, blending, compounding, reacting, devolatilizing, pyrolytically combusting, and the like, a material entrance is provided at one end of the barrel and a material discharge is provided at the other.

Multiple shaft mixers of this type are well suited to the power mixing and kneading of a continuous flow of synthetic plastic and like materials and subject the material being processed to intense shearing and kneading forces. In mixing machines of this type, interwiping mixing paddles or worms are fixed on the elongate shafts which are driven at the same speed in the same direction of rotation. Materials of the type processed in such mixers now, or to be processed in the future, require the application of ever higher forces to efficiently process the material at the higher rates of production desired, but the application of sufficiently high forces to the material in present day machinery is complicated by a number of factors. After the geometry of a twin shaft, co-rotating mixer is determined, a fixed shaft to shaft center distance to bore diameter ratio must be maintained in order for the radially opposite mixing paddles to co-wipe, and, at the same time, completely wipe the interior of the mixing chamber. Shaft deflection is a major potential source of difficulty and the shafts must be sufficiently heavy duty so that deflection is limited. This dictates the relatively close spacing of large diameter shafts which limits the size of the gear teeth that can be used to drive the shafts. It is further necessary that the machine be kept relatively compact, and of not undue length, and that there be an equal torque distribution to each of the two mixing shafts. Typical machines of this general character are disclosed in the present assignees prior U.S. Pat. Nos. 3,195,868; 3,198,491; 3,423,074; 3,463,459; 3,387,826; and 3,779,522, which are incorporated herein by reference. As a matter of background, other patents which are known to applicant are as follows:

| | |
|---|---|
| 819,800 | Richards |
| 1,371,046 | Mosher |
| 1,587,300 | Hanley, Jr. |
| 3,749,374 | Buchheit |
| 3,901,482 | Kieffaber |
| 3,907,259 | Leclercq |

The E. L. Richards U.S. Pat. No. 819,800, discloses a machine in which the shafts are driven from opposite ends. Patents which disclose single motor drives are disclosed in Hanley U.S. Pat. No. 1,587,300 and Mosher U.S. Pat. No. 1,371,046. The Buchheit U.S. Pat. No. 3,749,374 discloses a dual drive arrangement in which separate drive motors drive each of the screws. None of the patents singularly or combinatively are considered to be materially pertinent to the invention claimed.

SUMMARY OF THE INVENTION

A high horsepower, multiple shaft mixer, having axially parallel mixing shafts, with co-wiping mixing paddle or other co-wiping sections fixed thereon, is uniquely driven at one end of the mixer by each of several, rotary hydraulic motors supplied with operating fluid by a common pump system in a manner to equally distribute greatly increased torque to each of the mixer shafts so that work input and mechanical stresses are equalized on each shaft.

One of the prime objects of the present invention is to provide increased horsepower to twin shaft, co-rotating mixers, while maintaining the required shaft center to center, distance to bore diameter ratio, to achieve a higher throughput rate of material per unit size of the machine.

Still another object of the invention is to provide a balanced distribution of the greater horsepower imparted so that each mixer shaft receives an equally distributed work input load, and mechanical stresses on each shaft are uniformly equal during operation.

Still another object of the invention is to provide a mixer system of improved mechanical strength and reliability, which has reduced gear tooth loading and a reduced bearing loading.

Still a further object of the invention is to provide a mixing machine of the character described which is simplified, more compact, and more economical to construct and operate, as a result of the elimination of the complex gear reduction trains used in many prior art mixers.

Still another object of the invention is to provide a mixer system which enables multiple, self-equalizing, torque imparting, hydraulic motors to share the input loading to mixer members in a manner to maintain radial synchronization and greatly increase the power supplied to the shafts, without increasing the size of the machine, shafts, mixer paddles, and barrel processing chamber.

Other objects and advantages of the present invention will be pointed out specifically, or will become apparent from the following description, when it is considered in conjunction with the appended claims and the accompanying drawings.

DESCRIPTION OF THE DRAWINGS

In the drawings, FIG. 1 is a partly sectional, somewhat schematic, side elevational view of a mixing machine which incorporates the invention.

FIG. 2 is a enlarged, partly sectional, fragmentary plan view, taken on the line 2—2 of FIG. 1 to illustrate the mixer drive system.

FIG. 3 is a fragmentary, schematic elevational view thereof taken on the line 3—3 of FIG. 2, FIG. 4 is a fragmentary, transverse sectional view taken on the line 4—4 of FIG. 1;

FIG. 5 is a simplified schematic hydraulic diagram.

Figure 6:
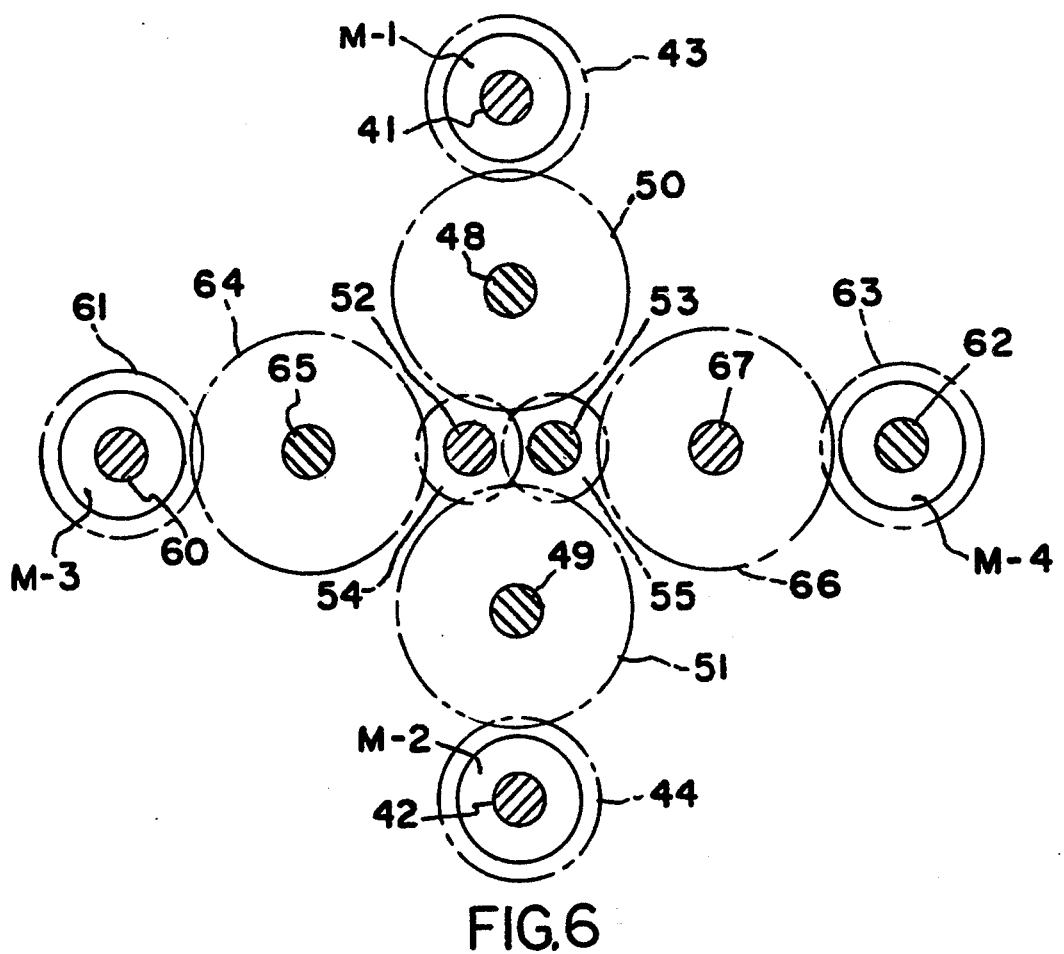
FIG. 6 is a view similar to FIG. 3 disclosing a modified system in which additional hydraulic drive motors are employed.

A typical mixing machine employing the invention is disclosed in FIG. 1 and utilizes a base 10 provided with upstanding support walls 11 and 12. Supported by the walls 11 and 12, is a housing generally designated H, which typically is comprised of separable halves which are pivotally connected for purposes of obtaining access to the mixing chamber 13 which is provided within the two piece mixer barrel 14 of housing H. As FIG. 4 indicates, barrel 14 is of figure eight configuration, and provides a chamber 13 of figure eight configuration consisting of a pair of intersecting cylindrical passages 13a and 13b. Jacketing 15 surrounds the barrel portions 14 and provides the chambers 16 within which heating or cooling fluid can be continuously circulated, dependent upon what the mixing process requires. The figure eight barrel 14 may be disposed horizontally as well as vertically.

Extending axially through the passages 13a and 13b within barrel 14, are the usual pair of elongate co-rotating shafts 17 and 18, which are typically supported by bearings 19 and 20 at each end of the machine. The bearings 19 may be integrated with a gear box 38 to be later described and the bearings 20 when utilized, may be supported on a discharge housing 21 which typically may have a discharge outlet 22 that communicates with a barrel discharge opening 23 in an end wall portion 24. The discharge opening 23 typically communicates with a discharge opening 25 provided in the upright support 12.

At the opposite end of the machine, an inlet housing portion 26, which is jacketed as at 27 to provide a fluid circulating chamber 28, has an inlet opening 29 for the purpose of supplying material to the chamber 13. As is typical, radially inter-wiping worms or flights 30 and 31 may be provided on the shafts 17 and 18 beneath opening 29. It is to be understood that these flights 30 and 31 are of a configuration to co-wipe as well as completely wipe the interior walls of the barrel 14. For this purpose, the flights 30 and 31 may be of the single lead configuration disclosed in U.S. Pat. No. 4,826,323 issued May 2, 1989, however, other configurations having multiple leads may also be employed.

Provided also on shafts 17 and 18, are the usual mixing and kneading paddles 32 and 33, respectively, which also are co-wiping and must completely wipe one another, as well as the barrel 14 walls forming chamber 13. Paddles 32 and 33 may also be of single or multiple lead configuration to fit the particular processing which the machine is undertaking. At the discharge end of the machine, the shafts 17 and 18 are seen as extending into and through the discharge housing 21. While extrusion screws are not shown as provided on the shafts 17 and 18 at the discharge end of the machine, they may, of course, be employed, and the configuration of the discharge housing 21 can also be varied. For example, extrusion screws on the shafts 17 and 18 may deliver the material directly to an extrusion and pelletizing die.

Keeping in mind that the shafts 17 and 18 are of the maximum size which may be employed within barrel chamber 13, and that a fixed shaft center to center distance to bore diameter ratio must be observed for the selected geometry in order to achieve co-wiping and wiping of the barrel walls, the problem solved by the present invention is how to efficiently and economically supply a greater torque to shafts 17 and 18 in a manner which equalizes torque distribution to the shafts which must rotate at the same speed in the same direction of rotation to advance the material from the charge end of the machine to the discharge end.

The present invention employs more than one hydraulic motor in a manner to uniquely drive each of the shafts 17 and 18. In FIG. 2 the pair of rotary hydraulic motors M1 and M2 are employed. It is to be understood that such motors are commonly available and are marketed, for example, by CharLynn Company of Minneapolis, Minn. Typically, as FIG. 5 discloses, a variable displacement hydraulic pump P, driven by an electric or other motor 35, supplies fluid to drive both motors M1 and M2 in the same direction of rotation. Pump P obtains the hydraulic fluid which it pumps via a charge pump 36 communicating with reservoir 37. It is not intended to do more than schematically portray the hydraulic circuit, since such circuits are well known and all of the elements are marketed by many companies. It is to be noted that the motors M1 and M2 are driven in parallel so that each is driven at the same rate of speed in the same direction of rotation to deliver the same horsepower.

Motors M1 and M2 are mounted on a gear box housing, generally designated 38, which has bearings 39 and 40 for respectively journaling the output shafts 41 and 42 of the motors M1 and M2 respectively. Fixed to shaft 41, are helical gears 43 and 43a, which have helix angles of opposite hand. The output shaft 41, and gears 43 and 43a may be aptly termed an output shaft system for motor M-1. Fixed to shaft 42, are helical gears 44 and 44a, having helix angles of opposite hand which are identical to gears 43 and 43a, respectively. The shaft 42 and gears 44 and 44a may be aptly termed an output shaft system for motor M-2. Housing 38 supports bearings 45 for journaling the shaft 48 on which opposite hand helical gears 50 and 50a, respectively, in mesh with gears 43 and 43a, respectively, are fixed. Also provided is a thrust bearing 74 which is secured to shaft 48, and supported in the housing 38. Bearings 46 supported by the housing 38 provide journals for a shaft 49 on which opposite hand helical gears 51 and 51a, respectively, in mesh with gears 44 and 44a, respectively, are fixed. Shafts 48 and 49 may aptly be termed countershafts. Thrust bearing 74 is confined by spacer rings 75 and 76 so as to prevent axial movement of shaft 48. The bearings 39, 40 and 46 and the shafts to which they attach and which they journal are, however, capable of axial movement or float within the confines of gaps 39a, 40a and 46a, for a purpose which will later be described. Each pair of gears 43–43a, 50–50a, 51–51a, and 44–44a may be referred to as a drive gear mechanism or system.

The shafts 17 and 18 at the charge end of the machine project forwardly into a coupling box assembly C and respectively key to a pair of superposed shafts 52 and 53, which may be termed chamber shaft extensions, or chamber shaft drive shaft portions, which are provided with protruding coupling ends 52a and 53a. The shaft 52 mounts a helical gear 54 which is in mesh with each of the gears 50a and 51a, respectively, whereas the shaft 53 mounts a helical gear 55 which is similarly in mesh with both of the gears 50 and 51. The gears 54 and 55 are radially lapping as shown in FIGS. 3 and 6, the shafts 52 and 53 being spaced apart the required center to center distance to achieve complete flight and paddle wiping and the gears 54, 55 extending radially as much as possible for structural strength. When considered from an end view (FIGS. 3 or 6), the gears 54, 55 are in radially overlying or lapping disposition. Because gears 54 and 55 are axially separated they are never in mesh. The shafts 52 and 53 are journaled respectively in sets of bearings 56 and 57 provided on the housing 38. The helical gears apply axial as well as radial forces and thrust bearings 58 and 59 are provided to absorb thrust loads on shafts 52 and 53, generated by both the axial components of the forces transmitted by the helical gears and the thrust loads generated in the discharge of the material being mixed. Also shafts 52, 53 and gears 54 and 55 are fixed axially by the thrust bearings 58 and 59.

As indicated, bearings 39, 46 and 40 are supported in housing 38 in such a way that shafts 41, 42 and 49 and therefore gears 43, 43a, 51, 51a, 44 and 44a are firmly radially supported but free to slide axially to a limited extent. The spline couplings 72 coupling output shafts 41 and 42 to the drives in hydraulic motors M1 and M2 respectively permit this restricted axial sliding movement of shafts 41 and 42. Because the mixing elements 32 and 33 shown in FIG. 4, must be in correctly matching, relative rotational positions, the rotational position of shafts 17 and 18 in FIG. 1 must be adjustable at final assembly. As previously disclosed, shafts 17 and 18 are directly coupled and axially and rotationally fixed to coupling ends 52a and 53a in coupling housing C, and the helical gears 54 and 55 are fixed to shafts 52 and 53 and mesh with the helical gears 50 and 50a, which have opposed helix angles. At final assembly, a slight axial adjustment of gears 50 and 50a, via axial movement of shaft 48 is employed to relatively rotationally position shafts 52 and 53, to relatively rotationally position the mixing elements 32 and 33 accurately. The final position of shaft 48 and gears 50 and 50a is fixed by placing spacer rings 75 and 76 of the correct thickness on either side of thrust bearing 74 before tightening down nut 77. Because the rotational positions of gears 54 and 55 are fixed by the above described procedure at assembly, provision must be made to allow gears 51 and 51a to correctly mesh with gears 54 and 55. Therefore gear 51a is separately keyed to shaft 49 via key 70 at assembly, after establishing its correct rotational position on shaft 49. It is then locked in place by nut 2. Any minor remaining error in rotational position after this procedure, will result in unequal gear tooth loading at the meshing surfaces of gears 51a and 54 and gears 51 and 55. Because the gears 51a, 54 and 51, 55 are helical any unequal loading will create unequal axial force components, which will cause shaft 49 to float axially, Until the forces are equal and gear mesh with zero backlash is achieved. Similarly, gear 44a is keyed to shaft 42 as at 71 and locked in correct rotational position by nut 73. Any unequal loading will cause shaft 42 to float axially until the force components are equal and perfect gear mesh is achieved. Any variation in the power supplied by motors M1 and M2 will also be automatically handled to properly balance the power distribution to shafts 17 and 18.

THE OPERATION

In operation, the common pump P drives each of the motors M1 and M2 simultaneously, and their drive is transmitted, respectively, to gears 43, 43a and 44, 44a, and on to the intermediate idler gears of opposite hand 50, 50a and 51, 51a. Since each of the shaft gears 54 and 55 is in mesh with a pair of the gears, 50a, 51a and 50, 51, respectively, and driven by both idler shafts 48 and 49 the power of each motor M1, and M2 is transmitted to the shafts 17 and 18 to obtain a total output horsepower equal to the sum of the horsepowers of both hydraulic motors. It has been experimentally determined that, regardless of geometric symmetry, the power requirement of each of the two parallel shafts of twin shaft continuous mixers is not always exactly equal. In one compounding experiment fluctuating power variations of +15% between shafts were observed. In the present system, the distribution of power to each output shaft 17 and 18, is quickly automatically balanced with its individual power requirement. If, for instance, the power transmitted by gear 51 to gear 55 is slightly higher than the power transmitted by gear 51a to gear 54 the difference in axial force components will cause gears 51 and 51a and shaft 49 to slide axially until the driving forces transmitted are equal. This, in turn, will cause gears 44 and 44a, and shaft 42, to slide axially and maintain an equal loading of gears 51 and 51a. Therefore, exactly half of the power from motor M2 is transmitted to gear 54, and half to gear 55. Normally, the power requirements of shafts 17 and 18 will be equal or substantially so.

As previously noted, the gear system, consisting of gears 50, 50a and shaft 48 is prevented from moving axially by the thrust bearing 74. Because shafts 52 and 53 are also axially fixed, it is possible to absorb thrust loads from the helical gears 50 and 50a so that the amount of power transmitted by gear 50 to gear 55 can be unequal to the power transmitted by gear 50a to gear 54, depending on the specific individual power requirement of shafts 17 and 18. Because shaft 41 with its gears 43 and 43a is free to float axially, the power transmitted to gears 50 and 50a is equally split between the meshing surfaces of gears 43 and 50 and the meshing surfaces of gears 43a and 50a. The following numerical example demonstrates the actual power distribution through the gears. Assuming for a particular mixing or compounding process, the total power requirement of the continuous mixer is "N" horsepower and the power requirement of shaft 52 is in an unusual extreme case 15% higher than shaft 53, then the power required at gear 55 is:

$$\frac{N}{1 + 1.15} = .465N$$

and the power required at gear 54 is N−0.465N=0.535N, because of the parallel arrangement of hydraulic motors M1 and M2 as shown in FIG. 5, and the identical design of these motors, the horsepower outputs may be assumed to be equal. Assuming further, for the sake of simplicity, that the mechanical efficiency of the drive mechanism is 100%, the output of each hydraulic motor is N/2 horsepower.

As previously described, the free axial movement of shaft 42 and shaft 49, causes an equal power split between gears 51 and 51a. Thus gear 55 receives ½ (N/2)=0.25N from motor M2 and gear 54 receives an equal amount, 0.25N, from motor M2. The horsepower output of Motor M1=N/2 horsepower.

Because the remaining power requirement at shaft 52 is equal to (0.535−0.25) N=0.285N and the remaining power requirement at shaft 53 is equal to (0.465−0.25) N=0.215, the axial force component at the mesh surfaces of gears 50a and 54 is larger than the axial force component at gears 50 and 55 and a net thrust force is generated on shaft 48 which is absorbed by thrust bearing 74, axial force components on gears 54 and 55 are absorbed by thrust bearings 58 and 59. The equal distribution of power from the pair of motors M1, and M2 also produces counteracting radial forces on shafts 52 and 53 because these forces are applied at 180° displaced positions to them as shown in FIG. 3, and this compared to single motor drives substantially reduces the radial bearing loads.

Figure 7:
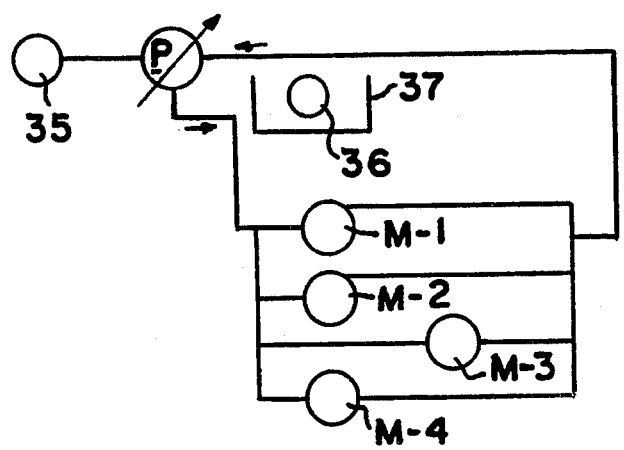
FIG. 7 is a schematic diagram similar to FIG. 5 and illustrating a hydraulic circuit for the modified system.

In FIG. 6 a modification of the invention described is disclosed in which additional hydraulic motors M3 and M4 are also placed in series with the motors M1 and M2 in FIG. 7. For purposes of convenience the same numerals or designations have been used to identify previously designated components. As shown in FIG. 6, in this version of the invention, motor M3 through its output shaft system which includes shaft 60 drives a helical gear 61, and motor M4, through its output shaft system which includes shaft 62 drives a helical gear 63. The helical gear 61 is in mesh with an intermediate helical gear 64 mounted on an idler shaft 65 which form component parts of the output shaft system for motor M3, gear 64 being in mesh with the helical gear 54 on shaft 52. Similarly, the output shaft system motor M4 includes gear 63, and a helical gear 66 in mesh therewith fixed on an idler shaft 67, gear 66 being in mesh with the helical gear 55 on shaft 53. All of the motors M1 through M4, the shafts associated with their output drive systems, and the various gears which have been described are supported by the gear box frame or housing 38, with the shafts being journaled in suitable bearings. The radially balanced system disclosed in FIGS. 6 and 7 increases the horsepower, which could be supplied to each shaft 17 and 18 by a single motor, by a multiple of 3, since each gear 52 and 53 is in effect driven by 3 motors. The configuration virtually eliminates unbalanced radial forces on the shafts 52, 53, 17 and 18 and associated bearings to avoid bending stress and deflection considerations.

It is to be understood that the drawings and descriptive matter are in all cases to be interpreted as merely illustrative of the principles of the invention, rather than as limiting the same in anyway, since it is contemplated that various changes may be made in various elements to achieve like results without departing from the spirit of the invention or the scope of the appended claims.

What is claimed is:

1. A high horsepower continuous processing machine for mixing, blending, compounding, reacting, devolatilizing, and pyrolytically combusting comprising:
   a. an elongate barrel having walls forming an elongate continuous processing chamber of the configuration of a plurality of intersecting cylinders, and having a material entrance at one end of the chamber and a material discharge at the other;
   b. a pair of axially fixed spaced apart, parallel, rotatable chamber shafts extending in said processing chamber axially in each intersecting cylinder and having axially fixed, co-extensive, parallel extensions outboard of said chamber.
   c. radially interacting, relatively angularly oriented material processing portions on each chamber shaft in co-wiping engagement with like portions on the other chamber shaft, the processing portions being configured to also wipe the chamber walls;
   d. a hydraulic pump system including a hydraulic pump and at least a pair of parallelly disposed rotary hydraulic motors driven in parallel by the said hydraulic pump for driving said chamber shafts at the same speed of rotation and in the same direction of rotation, each motor having an output shaft system, with helical gears, in parallelism with said shaft extensions, driven in the same direction of rotation;
   e. a helical gear with helically disposed peripheral teeth fixed on each shaft extension, the gear on each shaft extension extending radially sufficiently to lie in a radially lapping relationship with the bear on the other shaft extension in which one gear extends radially inward of the periphery of the other gear but lies in a different radial plane than said gear on the other shaft extension so that the teeth of the respective helical gears on the shaft extensions are radially offset and not in mesh;
   f. intermediate shafts parallel with said output shaft systems and shaft extensions, said intermediate shafts being journaled radially between said output shaft systems and shaft extensions; and
   g. a helical drive gear mechanism on each intermediate shaft driven by helical gears on a different one of said output shaft systems, each said helical drive gear mechanism being of an axial extent to overlie both of the axially separated helical gears on said shaft extensions, each helical drive gear mechanism being in mesh with the gear on each shaft extension so that each shaft extension and chamber shaft is driven by both hydraulic motors, one of the intermediate shafts being mounted so that it cannot move axially, and the other intermediate shaft and said output shaft systems being mounted for limited axial movement.

2. The machine of claim 1 in which each drive gear mechanism comprises a pair of helical gears of opposite hand driven in the same direction of rotation and said helical gears on said shaft extensions are of corresponding opposite hand.

3. The machine of claim 1 in which the helical drive gears mechanisms are in 180° opposed relation on opposite sides of said gears on said chamber shaft extensions.

4. A high horsepower continuous processing machine for mixing, blending, compounding, reacting, devolatilizing, and pyrolytically combusting comprising:
   a. an elongate barrel having walls forming an elongate continuous processing chamber of the configuration of a plurality of intersecting cylinders, and having a material entrance at one end of the chamber and a material discharge at the other;
   b. at least a pair of spaced apart, parallel, rotatable chamber shafts extending in said processing chamber axially in each intersecting cylinder and having co-extensive, parallel chamber shaft drive portions outboard of said chamber;
   c. radially interacting, relatively angularly oriented material processing portions on each chamber shaft in co-wiping engagement with like portions on the other chamber shaft, the processing member portions being configured to also wipe the chamber walls;
   d. at least a pair of synchronously driven rotary motors for driving said chamber shafts at the same speed of rotation in the same direction, each motor having an output shaft system;
   e. a separate gear with peripheral teeth for driving each chamber shaft drive shaft portion, the respective gears lying in different radial planes so that the gear teeth of the gear for driving each chamber shaft drive shaft portion are radially offset from the gear teeth for the other chamber shaft drive shaft portion and the respective gear teeth for each said gear are not in mesh; and
   f. a pair of separate elongate drive gear mechanisms driven independently by each of the output shaft systems, each said drive gear mechanism being of an axial extent to simultaneously radially overlie the radially offset teeth of said gears for driving said chamber shaft drive shaft portions, each separate drive gear mechanism having teeth in mesh with the gear teeth of both of said gears so that each chamber shaft drive shaft portion and chamber shaft is driven by the output shaft system of both motors.

5. The machine of claim 4 in which said gears for driving each of said chamber shaft drive shaft portions are helical and of opposite hand, and each said drive gear mechanism comprises a pair of axially adjacent helical gears of opposite hand in mesh with said gears for the chamber shaft drive shaft portions, said drive gear mechanisms being 180° oppositely disposed to one another and counterbalancing their respective thrust loads.

6. The invention defined in claim 4 wherein said pair of motors are hydraulic motors; a pump system is provided for driving them in parallel, and a second pair of hydraulic motors, driven in parallel by the same said pump system, is provided, each motor of said second pair having an output shaft system in parallelism with said chamber shaft drive shaft portions and being driven in the same direction of rotation, the output drive systems of said first pair of motors having drive shafts in 180° opposed relation, and the output shaft systems of said second pair of motors also having drive shafts in 180° opposed relation, disposed at 90° intervals with respect to said drive shafts of the output shaft systems of said first pair of motors, there being a drive gear on each drive shaft of the output shaft systems of said second pair of motors in mesh with a different one of said gears for driving the chamber shaft drive shaft portions; and wherein the drive of each motor of the second pair of motors is transmitted wholly to a different one of the separate gears for driving the chamber shaft drive shaft portions and chamber shafts so that each chamber shaft is driven in rotation by three motors at the same speed in the same direction.

7. The machine of claim 4 in which said separate drive gear mechanisms are in 180° opposed relation for driving opposite sides of said gears on said chamber shaft drive shaft portions.

8. A method of operating a high horsepower continuous processing system for mixing, blending, compounding, reacting, devolatilizing, and pyrolytically combusting comprising an elongate barrel having walls forming an elongate continuous processing chamber of the configuration of a plurality of intersecting cylinders, and having a material entrance at one end of the chamber and a material discharge at the other, at least a pair of spaced apart, parallel, rotatable chamber shafts extending in the processing chamber axially in each intersecting cylinder and having co-extensive, parallel chamber shaft extensions outboard of the chamber, radially interacting, relatively angularly oriented material processing members on each chamber shaft in co-wiping engagement with like members on the other chamber shaft, the processing members being configured to also wipe the chamber walls, a hydraulic pump system, at least a pair of rotary hydraulic motors driven by the same said hydraulic pump system for driving the chamber shafts at the same speed of rotation and in the same direction of rotation, each motor having an output shaft system driven in the same direction of rotation, a separate gear for driving each chamber shaft extension, the gear for each chamber shaft extension lying in a different radial plane than the gear for the other chamber shaft extension so that the gears are radially offset and not in mesh, at least a pair of separate elongate drive gear mechanisms driven independently by each of the output shaft systems, each drive gear mechanism being of an axial extent to simultaneously radially overlie both of said radially offset gears for the chamber shaft extensions, each separate drive gear mechanism being itself simultaneously in mesh with both of said gears so that each chamber shaft extension and chamber shaft is driven by the output shaft system of both hydraulic motors, the steps of:

a. pumping hydraulic fluid from the same hydraulic pumping system to each of said rotary hydraulic motors via parallel supply lines to drive the output shaft system of each at substantially the same speed; and b. mechanically transmitting the drive of each motor output shaft to each of said chamber shafts via said drive gear mechanisms and gears for the chamber shafts and rotating each chamber shaft via the torque exerted by both hydraulic motors at the same speed of rotation and in the same direction of roration regardless of the load imposed individually on the chamber shafts.

9. The method of claim 8 in which said system comprises a second pair of hydraulic motors driven by the same said pump system synchronously, each motor of said second pair having an output shaft system with a drive shaft in parallelism with said chamber shaft extensions and being driven in the same direction of rotation, said output shaft systems of the first pair of motors having drive shafts in 180° opposed relation and the drive shafts of said output shaft systems of the second pair of motors being disposed at 90° intervals with respect to the drive shafts of the output shaft systems of the first pair of motors in radially balanced relation, and a drive gear for each drive shaft of the output shaft systems of the second pair of motors in mesh with a different one of said gears for driving the chamber shaft extensions; and wherein the drive of each motor of the second pair of motors is transmitted wholly to a different one of the gears for driving the chamber shaft extensions and chamber shafts so that each chamber shaft is driven in rotation by three motors at the same speed in the same direction of rotation.

10. A high horsepower continuous processing machine for mixing, blending, compounding, reacting, devolatilizing, and pyrolytically combusting comprising:

a. an elongate barrel having walls forming an elongate continuous processing chamber of the configuration of a plurality of intersecting cylinders, and having a material entrance at one end of the chamber and a material discharge at the other;

b. at least a pair of spaced apart, parallel, rotatable chamber shafts extending in said processing chamber axially in each intersecting cylinder and having co-extensive, parallel extensions outboard of said chamber;

c. radially interacting, relatively angularly oriented, material processing portions on each chamber shaft in co-wiping engagement with like members on the other chamber shaft, the processing members being configured to also wipe the chamber walls;

d. at least a pair of synchronously driven rotary hydraulic motors for driving said chamber shafts at the same speed and in the same direction of rotation, each motor having an output shaft system;

e. a gear with peripheral teeth for driving each chamber shaft extension, the gear for driving each chamber shaft extension being in radially lapping disposition with the gear for driving the other shaft extension, but lying in a different radial plane than the gear for driving the other chamber shaft extension so that the teeth of the respective gears are radially offset and not in mesh; and f. a pair of countershafts, each mounting a separate pair of intermediate drive gears driven by each of the output shaft systems, an intermediate drive gear of each pair being in mesh with said gear for driving each chamber shaft extension so that each chamber shaft extension and chamber shaft is driven by the output shaft system of both hydraulic motors.

11. The invention defined in claim 10 wherein a hydraulic pump system drives each of said pair of hydraulic motors, and a second pair of hydraulic motors, driven in parallel by the same said pump system, is provided, each motor of said second pair having an output shaft system in parallelism with said shaft extensions and being driven in the same direction of rotation, the output shaft systems of said first pair of motors having drive shafts in 180° opposed relation, and the output shaft systems of said second pair of motors also having drive shafts in 180° opposed relation, disposed at 90° intervals with respect to said drive shafts of the output shaft systems of said first pair of motors, there being a drive gear on each drive shaft of the output shaft systems of said second pair of motors in mesh with a different one of said gears for driving the chamber shaft extensions.

12. The machine of claim 10 in which each intermediate drive gear of the pairs of gears is helical and said gears for driving said chamber shaft extensions are helical, and one of said pairs of intermediate drive gears is axially fixed while said output shaft systems and the other pair of said intermediate drive gears is mounted for limited axial floating movement.

13. The machine of claim 10 in which said countershafts are in 180° opposed relation on opposite sides of said gears for driving said chamber shaft extensions.

14. The machine defined in claim 10 in which one of the countershafts is mounted so that it cannot move axially, the other countershaft and said output shaft systems being mounted for limited axial movement.

15. A method of operating a high horsepower continuous processing system for mixing, blending, compounding, reacting, devolatilizing, and pyrolytically combusting comprising an elongate barrel having walls forming an elongate continuous processing chamber of the configuration of a plurality of intersecting cylinders, and having a material entrance at one end of the chamber and a material discharge at the other, at least a pair of spaced apart, parallel, rotatable chamber shafts extending in the processing chamber axially in each intersecting cylinder and having co-extensive, parallel extensions outboard of the chamber, radially interacting, relatively angularly oriented material processing members on each chamber shaft in co-wiping engagement with like members on the other chamber shaft, the processing members being configured to also wipe the chamber walls, a hydraulic pump system, at least a pair of rotary hydraulic motors driven by the same said hydraulic pump system for driving the chamber shafts at the same speed of rotation and in the same direction of rotation, each motor having an output shaft system driven in the same direction of rotation, a helical gear with helical peripheral teeth for driving each chamber shaft extension, the teeth of the helical gear for driving each chamber shaft extension being in radially offset lapping disposition with respect to the teeth of the gear for driving the other chamber shaft extension, a separate helical drive gear system driven by each of the output shaft systems, and bearings supporting said drive gear systems and chamber shaft extensions, each drive gear system being in mesh with the gear for driving each chamber shaft extension so that each chamber shaft extension and chamber shaft is driven by the output shaft systems of both hydraulic motors, the steps of:

a. pumping hydraulic fluid from the same said hydraulic pump system to each of said rotary hydraulic motors via parallel supply lines to drive the output shaft system of each at substantially the same speed; and b. mechanically transmitting the drive of each output shaft system to each of said chamber shaft extensions via said drive gear systems and gears for driving said extensions, at 180° opposite locations, to balance the loads transmitted to said bearings by said drive gear systems and gears for driving the chamber shaft extensions and chamber shafts, and rotating each chamber shaft extension and chamber shaft, via the torque exerted by the output shaft systems of both hydraulic motors, at the same speed of rotation and in the same direction of rotation.

16. The method of claim 15 in which said system comprises a second pair of hydraulic motors driven by the same pump system synchronously, each motor of said second pair having an output shaft system with a drive shaft in parallelism with said shaft extensions and driven in the same direction of rotation, said output shaft systems of the first pair of motors having drive shafts in 180° opposed relation and the drive shafts of said output shaft systems of the second pair of motors being disposed at 90° intervals with respect to the drive shafts of the output shaft systems of the first pair of motors in radially balanced relation, and an output system drive gear for each drive shaft of the output shaft systems of the second pair of motors in mesh with a different one of said gears for driving the chamber shaft extensions; and wherein the drive of each motor of the second pair of motors is transmitted wholly to a different one of the gears for driving the chamber shaft extensions and chamber shafts so that each is driven in rotation by three motors at the same speed in the same direction of rotation.

17. The method of claim 15 wherein said gears for driving the chamber shaft extensions and chamber shafts and one of the helical drive gear systems are axially fixed, and said other drive gear system axially floats within limits.

18. The method of claim 17 wherein said chamber shafts have unequal power requirements and some of the driving force being supplied to the axially fixed drive gear system by one of the output shaft systems is absorbed as axial thrust.

* * * * *

UNITED STATES PATENT AND TRADEMARK OFFICE
CERTIFICATE OF CORRECTION

PATENT NO. : 5,344,230
DATED : September 6, 1994
INVENTOR(S) : James E. Kowalczyk and Bernard A. Loomans It is certified that error appears in the above-indentified patent and that said Letters Patent is hereby corrected as shown below:

Column 5, line 40, change "Until" to -- until --.

Column 8, line 29, change "gears" to -- gear --; line 42, before "portions" insert -- shaft --.

Column 10, line 58, change "portions" to -- members --.

Column 11, line 12, change "system" to -- systems --.

Signed and Sealed this

First Day of November, 1994

Attest:

BRUCE LEHMAN

*Attesting Officer*     *Commissioner of Patents and Trademarks*